US011611559B2

(12) United States Patent
Rubin

(10) Patent No.: US 11,611,559 B2
(45) Date of Patent: Mar. 21, 2023

(54) IDENTIFICATION OF PERMUTATIONS OF PERMISSION GROUPS HAVING LOWEST SCORES

(71) Applicant: Microsoft Technology Licensing, LLC, Redmond, WA (US)

(72) Inventor: Mor Rubin, Ashdod (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 17/124,114

(22) Filed: Dec. 16, 2020

(65) Prior Publication Data

US 2022/0191207 A1    Jun. 16, 2022

(51) Int. Cl.
H04L 9/40 (2022.01)
(52) U.S. Cl.
CPC .......... H04L 63/101 (2013.01); H04L 63/105 (2013.01); H04L 63/1416 (2013.01); H04L 63/1466 (2013.01)
(58) Field of Classification Search
CPC . H04L 63/101; H04L 63/105; H04L 63/1416; H04L 63/1466
See application file for complete search history.

(56) References Cited

U.S. PATENT DOCUMENTS

| 10,754,506 | B1 * | 8/2020 | Moyal | G06F 3/04842 |
| 2017/0295197 | A1 * | 10/2017 | Parimi | H04L 63/10 |
| 2019/0268354 | A1 * | 8/2019 | Zettel, II | H04L 63/1441 |
| 2021/0194913 | A1 * | 6/2021 | Hecht | H04L 63/105 |
| 2021/0203687 | A1 * | 7/2021 | Rabin | H04L 63/20 |
| 2022/0060497 | A1 * | 2/2022 | Crabtree | H04L 41/149 |
| 2022/0060507 | A1 * | 2/2022 | Crabtree | H04L 63/1433 |
| 2022/0060509 | A1 * | 2/2022 | Crabtree | H04L 63/1441 |
| 2022/0075782 | A1 * | 3/2022 | Hines | G06F 16/211 |
| 2022/0075825 | A1 * | 3/2022 | Helms | G06Q 40/02 |
| 2022/0078149 | A1 * | 3/2022 | Hines | H04L 63/0428 |
| 2022/0078195 | A1 * | 3/2022 | Sehgal | H04L 63/102 |

(Continued)

FOREIGN PATENT DOCUMENTS

EP    2128786 A1    12/2009

OTHER PUBLICATIONS

"International Search Report and Written Opinion Issued in PCT Application No. PCT/US2021/059040", dated Feb. 3, 2022, 11 Pages.

*Primary Examiner* — Joseph P Hirl
*Assistant Examiner* — Stephen T Gundry
(74) *Attorney, Agent, or Firm* — Mannava & Kang, P.C.

(57) ABSTRACT

According to examples, an apparatus may include a processor that may identify activities of an entity on resources over a predetermined period of time, in which the entity is to use permissions assigned to the entity over the resources to perform the identified activities. The processor may also identify which of a plurality of groups of permissions includes the permissions the entity used to perform the identified activities and may determine permutations of the identified plurality of groups of permissions. The processor may further calculate respective scores for each of the determined permutations to identify permutations of the groups of permissions having the lowest scores and may output information pertaining to the determined permutations having the lowest scores.

20 Claims, 4 Drawing Sheets

(56) References Cited

U.S. PATENT DOCUMENTS

| | | | |
|---|---|---|---|
| 2022/0078797 A1* | 3/2022 | Helms | G06F 16/9566 |
| 2022/0092510 A1* | 3/2022 | Orzechowski | G06N 20/00 |
| 2022/0103564 A1* | 3/2022 | Wang | H04L 63/102 |
| 2022/0103592 A1* | 3/2022 | Semel | H04L 63/20 |
| 2022/0124111 A1* | 4/2022 | Johnson | H04L 63/1425 |
| 2022/0129581 A1* | 4/2022 | Jones | G06F 16/901 |
| 2022/0158844 A1* | 5/2022 | Beecham | G06F 21/6209 709/227 |
| 2022/0191211 A1* | 6/2022 | Laliberte | H04L 63/126 |
| 2022/0191250 A1* | 6/2022 | Laliberte | H04L 63/20 |
| 2022/0200995 A1* | 6/2022 | Morin | H04L 63/101 |

* cited by examiner

IDENTIFICATION OF PERMUTATIONS OF PERMISSION GROUPS HAVING LOWEST SCORES

BACKGROUND

Providers, such as cloud providers, organizations, and the like, may grant users access to a variety of shared resources. In order to provide secure access, guarantee privacy, and/or adhere to legal and compliance regulations, the providers may implement access models that may allow for organizational administrators to apply restrictions on resource access. For instance, the organizational administrators may assign the users with various permissions to the shared resources such that the users may have limited access to the resources.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
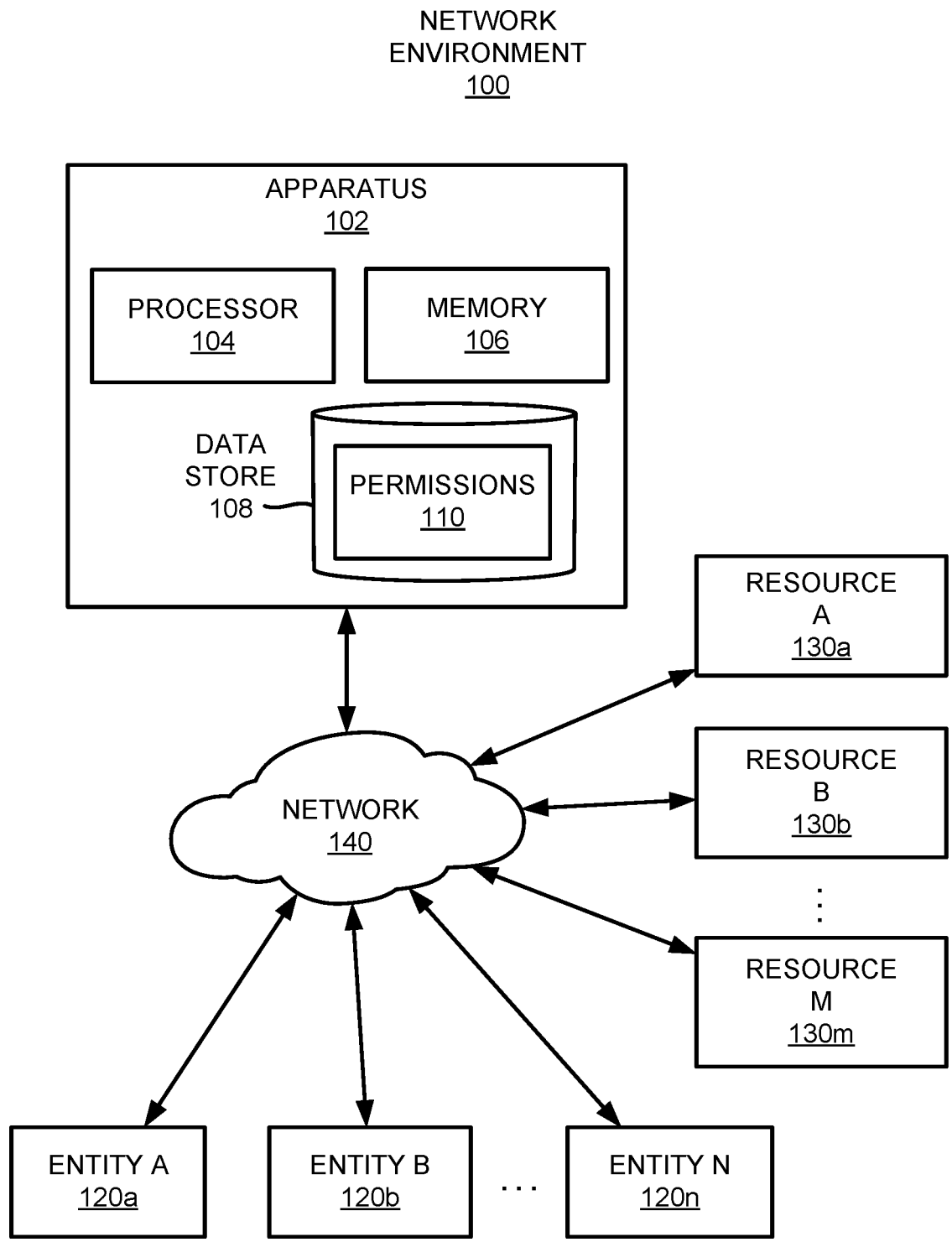
FIG. 1 shows a block diagram of a network environment, in which an apparatus may manage permissions assigned to entities to access resources, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are systems, apparatuses, methods, and computer-readable media in which a processor may manage permissions assigned to entities to access resources. Particularly, for instance, instead of assigning permissions to entities to access resources based on the group or groups of an organization to which the entities belong, the permissions may be assigned to the entities based on the groups of permissions that the entities may have used over a predetermined period of time. That is, for instance, the processor may identify activities of an entity on a plurality of resources over the predetermined period of time, in which the entity is to use permissions assigned to the entity over the resources to perform the identified activities. In other words, the processor may identify which of the resources the entity accessed over the predetermined period of time. The processor may also determine which permissions the entity may have used to access the resources over the predetermined period of time, for instance, based on mappings between low level permissions and the resources.

The processor may further identify which of a plurality of groups of permissions includes the permissions that the entity used to perform the identified activities. Some or all of the identified groups may include permissions that the entity did not use to perform the identified activities and thus, the identified groups may include various or different sets of permissions. According to examples, the groups of permissions may be assigned values that may be based on attack surfaces of the permissions in the groups. Each of the attack surfaces may be defined as a sum of vulnerabilities that may be exploited to carry out a security attack. For instance, a higher value may denote a higher attack surface.

The processor may determine permutations of the identified groups of permissions that include the permissions the entity used to perform the identified activities. That is, the processor may determine various combinations of the identified groups that include the permissions that the entity used to perform the identified activities during the predetermined period of time. The processor may also calculate respective scores for each of the determined permutations. The scores may be based on values assigned to the permissions and the groups of permissions, in which the values may be based on the attack surfaces of the permissions. In addition, the processor may output information pertaining to the determined permutations. For instance, the processor may output information pertaining to the permutations determined to have the lowest scores. The information may include the group or groups in the permutation or permutations having the lowest scores. This process may also be performed for the other entities. As the entities may access different resources, the permutations having the lowest scores may vary for different ones of the entities.

A technological issue with conventional management of entity permissions to resources may be that the entities may be provided with greater levels of permissions to the resources than the principals may need to normally perform their intended duties, which may expose the resources to attacks, e.g., malicious actors. Through implementation of various features of the present disclosure, a processor may determine least permissions that may be assigned to the entities over the resources using historical usage information and permissions included groups of permissions. As a result, assignment and/or modification of permissions assigned to the entities may be made to more accurately reflect the actual permission usage of the entities. A technological improvement of the features of the present disclosure may be that the entities may be assigned least permissions (e.g., privilege levels) over resources, which may improve security on the resources. That is, the features of the present disclosure may reduce and/or minimize attack surfaces on the resources.

Figure 2:
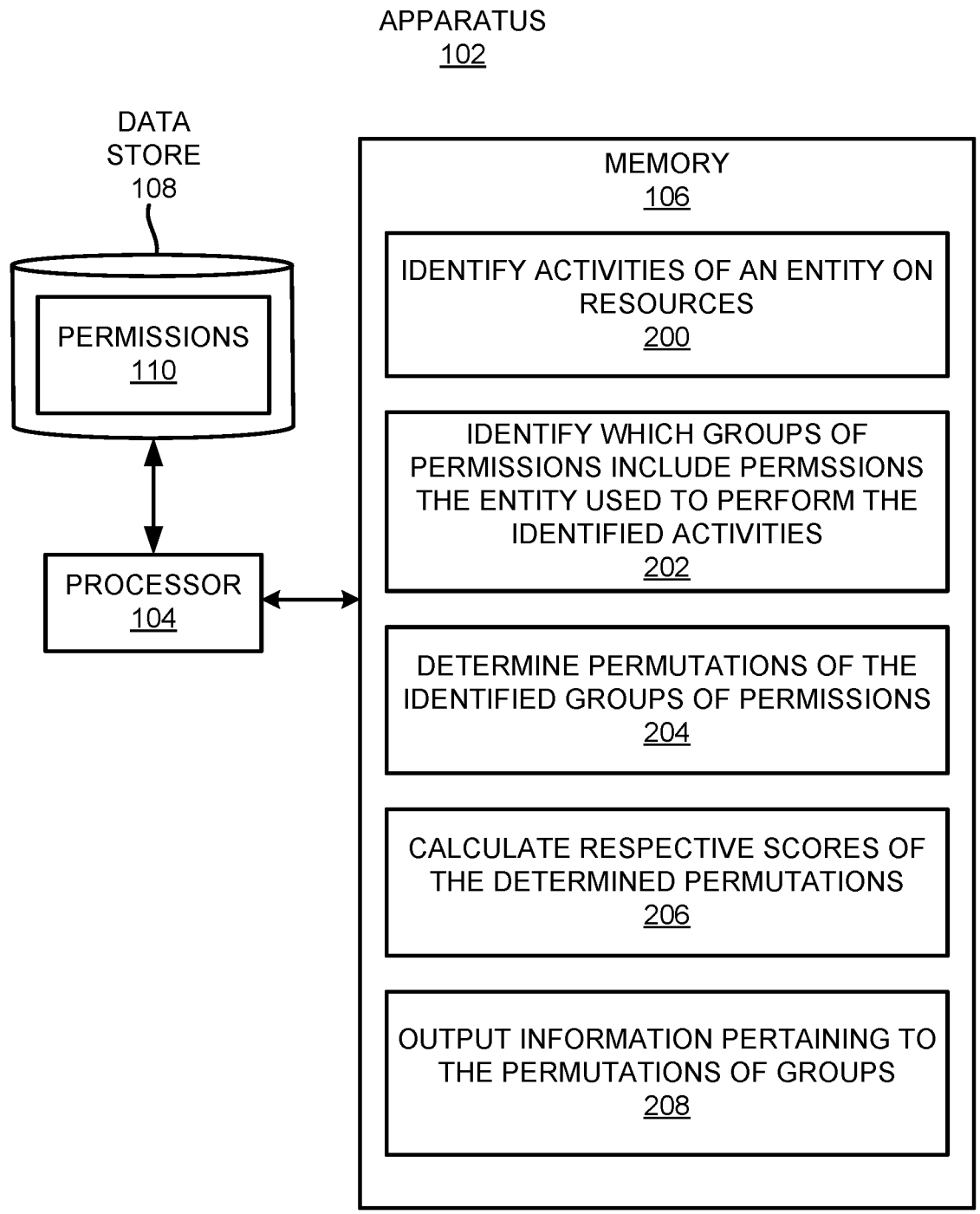
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may manage permissions assigned to entities 120a-120n to access resources, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 of the network environment 100 may include additional features and that some of the features described herein may be removed and/or modified without departing from the scopes of the network environment 100 and/or the apparatus 102.

As shown in FIG. 1, the network environment 100 may include the apparatus 102, a plurality of entities 120a-120n, resources 130a-130m, and a network 140. Each of the variables "n" and "m" may represent a value greater than 1. According to examples, the apparatus 102 may be a server or other type of computing device, e.g., a network gateway, an access point, or the like, that may provide administrative services to the entities 120a-120n. In some examples, each of the entities 120a-120n may be a user, user account, service, application, or the like. For instance, the first entity 120a may represent a first user account that is logged into a first computing device, the second entity 122b may represent a first service executing a second computing device, etc. As such, for instance, a user may log into different computing devices using a user account at different times. Likewise, different services may execute on different computing devices and may access the resources 130a-130m during the execution of the services.

As further shown in FIG. 1, the apparatus 102 may communicate with each of the entities 120a-120n via a network 140, which may be any suitable type of network through which the entities 120a-120n, e.g., the computing devices on which the entities 120a-120n are logged in, are executing, etc., and the apparatus 102 may communicate with each other, such as the Internet, a wide area network, a local area network, and/or the like. In addition, the entities 120a-120n may communicate with the resources 130a-130m via the network 140. The resources 130a-130m may each be a server, a service, a virtual machine, a data store, a file folder, an application, a document, a file, and/or the like.

In some examples, access to the resources 130a-130m by the entities 120a-120n may be controlled by permissions. In addition, the entities 120a-120n may be assigned various types of permissions to the resources 130a-130m, e.g., files, documents, data, and/or the like, stored on the resources 130a-130m. The various types of permissions may include permissions to access the resources 130a-130m, in which an entity 120a may not access a resource 130a if the entity 120a has not been assigned or granted a permission to access the resource 130a. The various types of permissions may also or alternatively include permissions regarding various types of access that the entities 120a-120n may have over the resources 130a-130m. The various types of access may include access to confidential resources and/or access to non-confidential resources, access to: read the resources, write to the resources, copy the resources, delete the resources, and/or the like.

According to examples, the entities 120a-120n may be members of an organization, such as a corporation, an educational institution, a government agency, and/or the like. In addition, the entities 120a-120n may be assigned to one or more roles within the organization and each of the roles may be assigned respective groups of permissions to access the resources 130a-130m. Thus, for instance, a first role may be assigned a first group of permissions to access a first set of the resources 130a-130m, a second role may be assigned a second group of permissions to access a second set of the resources 130a-130m, and so forth. In addition, some of the roles may overlap with each other such that some of the permissions in the groups of permissions may overlap with each other. That is, for instance, an entity 120a may access a resource 130a using a permission, in which the permission is included within a first group of permissions and a second group of permissions.

As shown in FIG. 1, the apparatus 102 may include a data store 108 on which assigned permissions 110 of the entities 120a-120n may be stored. For instance, the data store 108 may store the roles to which the entities 120a-120n are assigned as well as the groups of permissions that are assigned to the roles. The permissions 110, e.g., the roles, may be assigned to the entities 120a-120n and the groups of permissions may be assigned to the roles in any suitable manner. For instance, an administrator or other individual and/or the processor 104 may set these assignments according to aspects of the organization within which the entities 120a-120n are members.

The data store 108 may be a Random Access memory (RAM), an Electrically Erasable Programmable Read-Only Memory (EEPROM), a storage device, or the like. The assigned permissions 110 may be applied or enforced such that, for instance, access by the entities 120a-120n to the resources 130a-130m may be restricted by their respective assigned permissions. For instance, the apparatus 102 may employ role-based access control on the entities 120a-120n over the resources 130a-130m.

According to examples, and as discussed in greater detail herein, the apparatus 102 may manage the permissions assigned to the entities 120a-120n over the resources 130a-130m such that, for instance, the entities 120a-120n may be assigned appropriate permissions over the resources 130a-130m. That is, the apparatus 102 may manage the permissions assigned to the entities 120a-120n over the resources 130a-130m such that the entities 120a-120n may be assigned least permissions, e.g., minimal permission levels, that may enable the entities 120a-120n to normally perform their intended duties. The apparatus 102 may also apply the assigned least permission levels to the entities 120a-120n such that the entities 120a-120n may be prevented from having access (e.g., read access, write access, etc.) to the data associated with the resources 130a-130n that exceed the assigned least permissions. By assigning and applying the least permissions to the entities 120a-120n, access to the data associated with the resources 130a-130m may be better restricted, which may enhance security of the resources 130a-130m. For instance, the processor 104 may reduce attack surfaces of the resources 130a-130m.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-208 that the processor 104 may execute. Although the instructions 200-208 are described herein as being stored on the memory 106 and may thus include a set of machine-readable instructions, the apparatus 102 may include hardware logic blocks that may perform functions similar to the instructions 200-208. For instance, the processor 104 may include hardware components that may execute the instructions 200-208. In other examples, the apparatus 102 may include a combination of instructions and hardware logic blocks to implement or execute functions corresponding to the instructions 200-208. In any of these examples, the processor 104 may implement the hardware logic blocks and/or execute the instructions 200-208. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to identify activities of an entity 120a on a plurality of resources 130a-130m over a predetermined period of time. The predetermined period of time may be a user-defined period of time and may be based on historical data, may vary for different organizations, and/or the like. By way of example, the predetermined period of time may be around 30 days, 45 days, 60 days, and/or the like. The activities may include, for instance, access by the entity 120a to certain ones of the resources 130a-130m, in which the access may include, opening of a confidential document, opening of a non-confidential document, downloading of a document, copying of a document, modifying a document, deleting of a document or file; execution of an application, and/or the like. In any regard, the processor 104 may access a database on which data regarding the activities of entities 120a-120n on resources 130a-130m may be stored. For instance, the processor 104 may access a database corresponding to a directory service of an organization, a network, and/or the like.

The processor 104 may determine, for each of the resources 130a-130m that the entity 120a accessed, the permission assigned to access the resource 130a-130m. By way of example in which a resource 130a is a confidential document, the permission assigned may be a permission type that enables access to confidential documents. As another example in which a resource 130a is a corporate financial document, the entity 120a may need to be a member of a finance group, a management group, and/or the like of a corporation. In some examples, multiple types of permissions may enable access to the resource 130a.

The processor 104 may execute the instructions 202 to identify which of a plurality of groups of permissions that may include the permissions assigned to access the resources 130a-130m that the processor 104 identified as having been acted on by the entity 120a during the predetermined period of time. As discussed herein, the groups of permissions may correspond to various roles of entities within an organization. Thus, for instance, a finance group may be assigned with a first group of permissions, an IT group may be assigned with a second group of permissions, an administrative group may be assigned with a third group of permissions, a sales group may be assigned with a fourth group of permissions etc. In addition, subgroups within some or all of the groups may be assigned with respective sets of permissions.

In some instances, the entity 120a may have multiple roles within an organization and may have been assigned to have multiple groups of permissions. In addition, some of the multiple groups of permissions may include a number of permissions to access resources that the entity 120a may not have accessed during the predetermined period of time. As a result, some of the groups of permissions may enable greater levels of access to resources that the entity 120a used. As each of the permissions to the resources 130a-130m may be an attack surface, the greater the number of permissions assigned to the entity 120a, the greater the attack surfaces. Granting entities 120a-120n with greater numbers of permissions may thus increase security risks to the resources 130a-130m.

The processor 104 may execute the instructions 204 to determine permutations of the identified plurality of groups of permissions that include the permissions the entity 120a used to perform the identified activities on the plurality of resources 130a-130m. That is, for instance, the processor 104 may determine which of various combinations of the groups of permissions include the permissions that the entity 120a used to perform the identified activities on the plurality of resources 130a-130m during the predetermined period of time.

By way of particular non-limiting example, a first group, a second group, and a third group of permissions may each include the certain permissions. Some or all of these groups may also include permissions that the entity 120a did not use to perform the identified activities on the activities over the predetermined period of time. As a result, some of the groups may have greater attack surfaces than some of the other groups. In this example, a first permutation may include the first group of permissions, a second permutation may include the second group of permissions, a third permutation may include the third group of permissions, a fourth permutation may include the first and second groups, a fifth permutation may include the first and third groups, a sixth permutation may include the second and third groups, and a seventh permutation may include the first, second, and third groups.

According to examples, each of the permissions in the groups of permissions, e.g., the permissions that the entity 120a used to perform the identified activities and each of the permissions in the groups that the entity 120a did not use to perform the identified activities levels, may be assigned one of a plurality of values. The values may correspond to respective attack surfaces of the permissions. The attack surfaces may be defined as a sum of vulnerabilities that may be exploited to carry out a security attack. Thus, for instance, the permissions that provide access to greater levels of security attacks may be assigned with higher values. By way of example, permissions that enable access to administrative and/or IT resources may be assigned higher values than permissions that enable access to sales resources. In some examples, an administrator and/or other individual may have previously assigned the values to the permissions based on their respective attack surfaces.

According to examples, respective scores for each of the groups of permissions may be determined by, for instance, multiplying the values of the permissions in the group together. In addition, or alternatively, each of the groups of permissions may be assigned values based on the attack surfaces of the permissions included in the groups. In some examples, the values assigned to the permissions and/or the groups of permissions may be prime numbers as prime numbers may reduce or minimize collisions of scores determined from values.

In addition, the processor 104 may execute the instructions 206 to calculate respective scores for each of the determined permutations of the identified groups of permissions. That is, the processor 104 may multiply the scores of the groups in each of the determined permutations together to determine scores for each of the determined permutations. In keeping with the example discussed above and in which the first group has a score of 7, the second group has a score of 13, and the third group has a score of 11, the first permutation will have a score of 7, the second permutation will have a score of 13, and the third permutation will have a score of 11. Likewise, the fourth permutation may have a score of (7×13) 91, the fifth permutation may have a score of (7×11) 77, the sixth permutation may have a score of (11×13) 143, and the seventh permutation may have a score of (7×11×13) 1001. In addition, or alternatively, the processor 104 may arrange the permutations of the groups in an ascending (or descending) order according to the calculated respective scores of the permutations. The processor 104 may identify which of the determined permutations of groups have the lowest scores based on the arrangement of the permutations of the groups.

In addition, the processor 104 may execute the instructions 208 to output information pertaining to the determined permutations of groups having the lowest scores. The processor 104 may thus output information that identifies the permutations of groups of permissions that may have the smallest attack surfaces, e.g., the permutations of the groups that have five smallest scores, the two smallest scores, the smallest score, etc. In addition, the processor 104 may output the information as electronic data that may be communicated to an individual who may assign permissions to the entities 120a-120n and/or modify permissions assigned to the entities 120a-120n, such as an administrator, an IT personnel, a director, and/or the like. The electronic data may be in the form of information displayed on a web portal that the individual may access, information sent via an electronic mail message, and/or the like. In these examples, the individual may assign and/or modify the permissions assigned to the entity 120a such that the entity 120a may be assigned permissions according to the role or roles having the lowest score(s) and thus the lowest attack surface(s). As a result, the entity 120a may be assigned permissions to the resources 130a-130m that may increase security to the resources 130a-130m as well as to the network on which the resources 130a-130m may be accessible while likely enabling the entity 120a to continue accessing the resources 130a-130m may normally access.

In some examples, the processor 104 may identify the permutation of groups having a lowest calculated score. In addition, the processor 104 may assign the permissions in the identified permutation of groups to the entity 120a over the plurality of resources 130a-130n. In this regard, the entity 120a may be assigned with the permissions to the resources 130a-130m automatically, e.g., without human intervention, by the processor 104.

In some examples, the processor 104 may identify a current set of permissions assigned to the entity 120a over the plurality of resources 130a-130m. That is, the processor 104 may identify the role or roles that the entity 120a may have in an organization and may determine the set of permissions that the entity 120a may have been assigned over the resources 130a-130m from the identified role or roles. The processor 104 may also calculate a score of the current set of permissions. The processor 104 may calculate the score of the current set of permissions by multiplying the values assigned to the permissions in the current set of permissions to calculate the score of the current set of permissions. In addition, the processor 104 may map the current set of permissions to low level permissions, in which the low level permissions may be permissions assigned to the resources 130a-130m themselves.

In these examples, the processor 104 may determine which of the permutations of groups of permissions have scores that are below the score of the current set of permission levels. In addition, the processor 104 may output information pertaining to the arranged groups of the determined possible permutations that have scores that are below the score of the current set of permission levels.

It should be understood that the discussion presented herein directed to the assignment of permissions to the entity 120a may be applied to the other entities 120b-120n. In this regard, the entities 120b-120n may be assigned permissions to the resources 130a-130m that may reduce attack surfaces to the resources 130a-130m while enabling the entities 120b-120n to continue accessing the resources 130a-130m that the entities 120b-120n may typically access.

Figure 3:
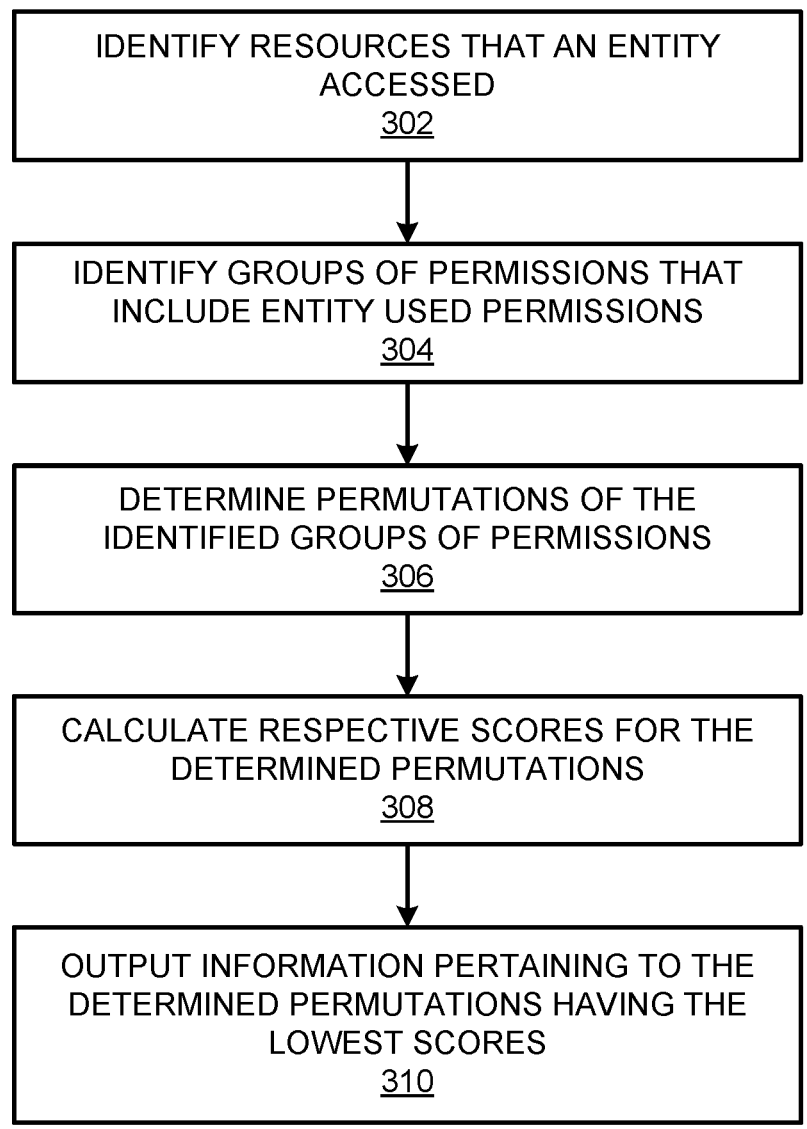
FIG. 3 depicts a flow diagram of a method for managing permissions assigned to entities to access resources, in accordance with an embodiment of the present disclosure.

Various manners in which the processor 104 of the apparatus 102 may operate are discussed in greater detail with respect to the method 300 depicted in FIG. 3. Particularly, FIG. 3 depicts a flow diagram of a method 300 for managing permissions assigned to entities 120a-120n to access resources, in accordance with an embodiment of the present disclosure. It should be understood that the method 300 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 104 may identify a plurality of resources 130a-130m that an entity 120a accessed over a predetermined period of time. As discussed herein, the entity 120a may use permissions assigned to the entity 120a over the identified plurality of resources 130a-130m to access the plurality of resources 130a-130m. The processor 104 may identify the resources 130a-130m that the entity 120a accessed from a database, such as a directory that stores such information. The processor 104 may also identify the permissions that the entity 120a used to access the resources 130a-130m based on, for instance, a mapping between the resources 130a-130m and low level permissions that may be assigned to access the resources 130a-130m.

At block 304, the processor 104 may identify which of a plurality of groups of permissions includes the permissions the entity 120a used to access the plurality of resources 130a-130m. The processor 104 may identify the groups of permissions by, for instance, comparing the permissions that the entity 120a used to access the resources 130a-130m with information regarding the permissions included in the groups of permissions.

At block 306, the processor 104 may determine permutations of the identified plurality of groups of permissions that include the permissions the entity 120a used to access the plurality of resources. That is, the processor 104 may determine a number of various permutations of the identified groups of permissions that include the entity 120a used permissions. By way of example in which there are four groups of permissions that include the entity 120a used permissions, the processor 104 may determine that there may be eleven permutations of groups.

At block 308, the processor 104 may calculate respective scores for each of the determined permutations to identify permutations of the groups of permissions having the lowest scores. As discussed herein, each of the groups of permissions and/or the permissions included in the groups may be assigned respective values, e.g., prime number values. The values may correspond to respective attack surfaces of the permissions. The respective scores for the permutations may be determined through multiplication of the values of the groups in the permutations.

At block 308, the processor 104 may output information pertaining to the determined permutations having the lowest scores. The processor 104 may implement similar types of operations for the other entities 120b-120n to determine permissions having the lowest scores and to output the determined permissions such that the entities 120a-120n may be assigned lowest level permissions to access the resources 130a-130m. In other words, the entities 120a-120n may be assigned the lowest level permissions to access the resources 130a-130m to maximize and/or optimize security on the resources 130a-130m.

According to examples, the processor 104 may identify a current set of permissions assigned to the entity 120a over the plurality of resources 130a-130m. The processor 104 may also calculate a score of the current set of permissions and may determine which of the permutations of groups have scores that are below the score of the current set of permission levels. For instance, the processor 104 may map the current set of permissions to low level permissions and may calculate the score of the current set of permissions as a score of the low level permissions. In these examples, the processor 104 may output information pertaining to the determined permutations that have scores that are below the score of the current set of permission levels.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
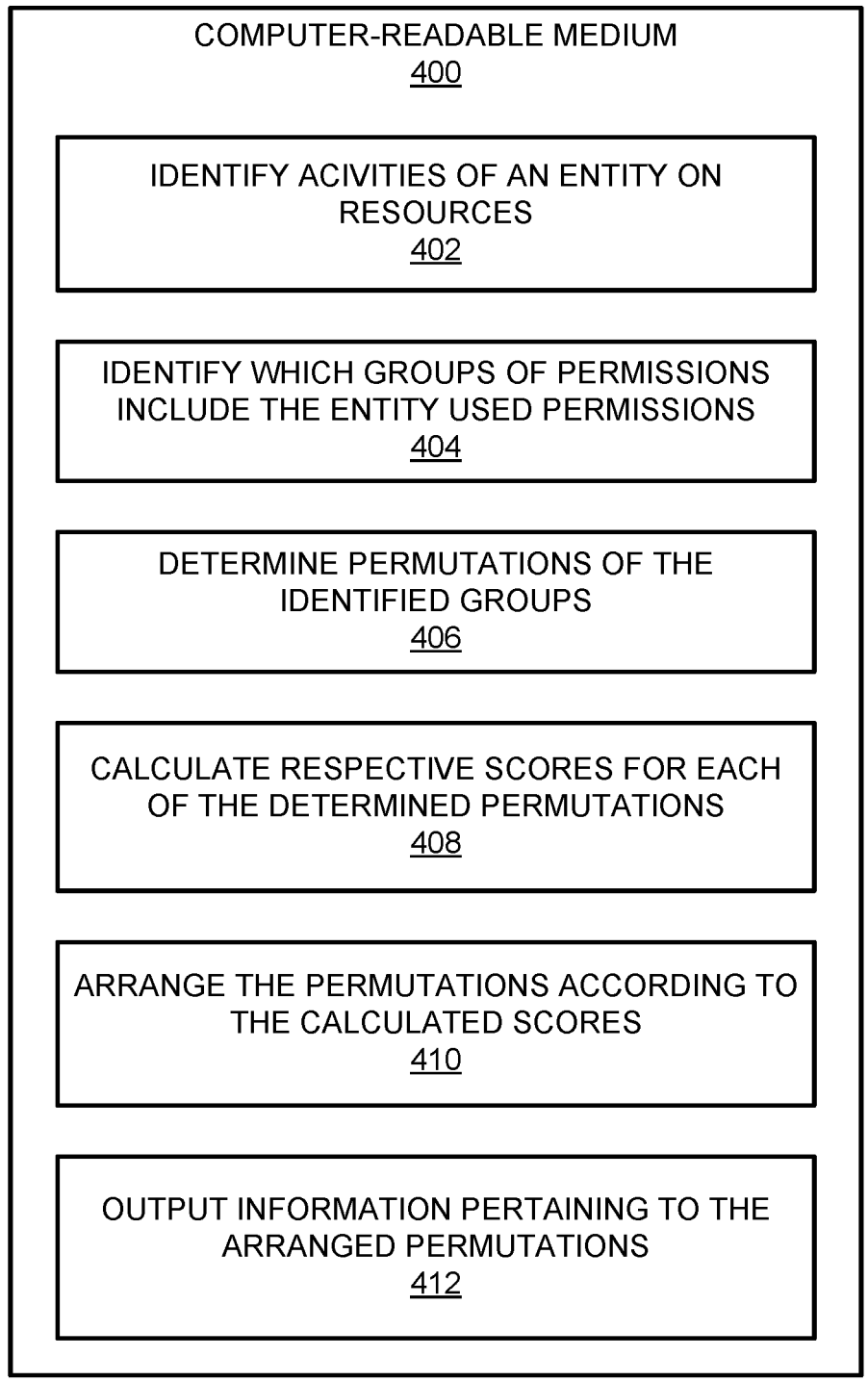
FIG. 4 depicts a block diagram of a computer-readable medium that may have stored thereon computer-readable instructions for managing permissions assigned to entities to access resources, in accordance with an embodiment of the present disclosure.

Turning now to FIG. 4, there is shown a block diagram of a computer-readable medium 400 that may have stored thereon computer-readable instructions for managing permissions assigned to entities 120a-120n to access resources 130a-130m, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-412 that a processor, such as the processor 104 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to identify activities of an entity 120a on a plurality of resources 130a-130m over a predetermined period of time, in which the entity 120a is to use permissions assigned to the entity 120a over the plurality of resources 130a-130m to perform the identified activities. The processor may fetch, decode, and execute the instructions 404 to identify which of a plurality of groups of permissions includes the permissions the entity 120a used to perform the identified activities. The processor may fetch, decode, and execute the instructions 406 to determine permutations of the identified plurality of groups of permissions.

The processor may fetch, decode, and execute the instructions 408 to calculate respective scores for each of the determined permutations. As discussed herein, at least one of the plurality of groups of permissions may include permissions that the entity 120a did not use to perform the identified activities on the plurality of resources 130a-130m over the predetermined period of time, in which each of the permissions that the entity 120a used to perform the identified activities and each of the permissions that the entity 120a did not use to perform the identified activities levels is assigned one of a plurality of values. In addition, to calculate the respective scores, and the processor may, for each of the permutations of groups, multiply the values assigned to the permissions in the permutations of groups to calculate the score for the permutation of groups.

The processor may fetch, decode, and execute the instructions 410 to arrange the permutations according to the calculated scores to identify permutations of the groups of permissions having the lowest scores. In addition, the processor may fetch, decode, and execute the instructions 412 to output information pertaining to the arranged permutations. In some examples, the processor may fetch, decode, and execute instructions to identify the permutation of groups having a lowest calculated score and to assign the permissions in the identified permutation of groups to the entity 120a over the plurality of resources 130a-130m.

In some examples, the processor may fetch, decode, and execute instructions to identify a current set of permissions assigned to the entity 120a over the plurality of resources, calculate a score of the current set of permissions, and determine which of the permutations of groups have scores that are below the score of the current set of permission levels. In addition, the processor may fetch, decode, and execute instructions to output information pertaining to the determined permutations that have scores that are below the score of the current set of permission levels.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that cause the processor to:
identify activities performed by an entity on a resource over a predetermined period of time, wherein the entity is to use a permission assigned to the entity over the resource to perform the identified activities;
identify groups of permissions that include the permission the entity used to perform the identified activities, wherein each of the groups of permissions is assigned a value based on a count of attack surfaces of the permissions in the group;
determine permutations of the groups of permissions, wherein the permutations are various combinations of the groups of permissions that include the permission that the entity used to perform the identified activities;
calculate respective scores for each of the determined permutations of the groups of permissions based on the values assigned to the groups of permissions;
based on the scores of the determined permutations of the groups of permissions, identify permutations of the groups of permissions having lowest scores; and
output information pertaining to the permutations having the lowest scores.

2. The apparatus of claim 1, wherein each of the groups of permissions corresponds to a particular role within an organization.

3. The apparatus of claim 1, wherein at least one of the groups of permissions includes permissions that the entity did not use to perform the identified activities on the resource over the predetermined period of time.

4. The apparatus of claim 3, wherein, to calculate the respective scores for the determined permutations of the groups of permissions, the instructions cause the processor to:
for each determined permutation of the groups of permissions, multiply the values assigned to the groups of permissions in the determined permutation to calculate the score for the determined permutation.

5. The apparatus of claim 1, wherein at least one permutation of the determined permutations includes a combination of two groups of permissions, and
wherein to calculate the score for the at least one permutation, the instructions cause the processor to multiply the values assigned to the two groups of permissions.

6. The apparatus of claim 1, wherein the instructions further cause the processor to:
identify a current set of permissions assigned to the entity over a plurality of resources including the resource accessed by the entity over the predetermined period of time;
calculate a score of the current set of permissions;
determine which of the determined permutations of the groups of permissions have scores that are below the score of the current set of permissions; and
output information pertaining to the determined permutations that have scores that are below the score of the current set of permissions.

7. The apparatus of claim 6, wherein the instructions further cause the processor to:
map the current set of permissions to low level permissions; and
assign the score of the current set of permissions as a score of the low level permissions.

8. The apparatus of claim 6, wherein each permission of the current set of permissions is assigned one of a plurality of values that correspond to respective attack surfaces of the permission and wherein the instructions further cause the processor to:
multiply the values assigned to the permissions in the current set to calculate the score of the current set of permissions.

9. The apparatus of claim 1, wherein the instructions cause the processor to arrange the determined permutations of the groups of permissions in an ascending order according to the calculated scores of the determined permutations.

10. The apparatus of claim 1, wherein the instructions cause the processor to:
identify a permutation of the groups of permissions having a lowest score; and
assign one of the permissions in the identified permutation having the lowest score to the entity over the resource.

11. A method comprising:
identifying, by a processor, a resource that an entity accessed over a predetermined period of time, wherein the entity is to use a permission assigned to the entity over the resource to access the resource;
identifying, by the processor, groups of permissions that include the permission the entity used to access the resource, wherein each of the groups of permissions is assigned a value based on a count of attack surfaces of the permissions in the group;
determining, by the processor, permutations of the groups of permissions, wherein the permutations are various combinations of the groups of permissions that include the permission the entity used to access the resource;
calculating, by the processor, respective scores for each of the determined permutations of the groups of permissions based on the values assigned to the groups of permissions;
based on the scores of the determined permutations of the groups of permissions, identifying permutations of the groups of permissions having lowest scores; and
outputting, by the processor, information pertaining to the permutations having the lowest scores.

12. The method of claim 11, said method further comprising:
for each determined permutation of the groups of permissions, multiply the values assigned to the groups of permissions in the determined permutation to calculate the score for the determined permutation.

13. The method of claim 11, wherein at least one permutation of the determined permutations comprises a combination of two groups of permissions, and
wherein the method further comprises:
calculating a score for the at least one permutation by multiplying the values assigned to the two groups of permissions.

14. The method of claim 11, further comprising:
identifying a current set of permissions assigned to the entity over a plurality of resources including the resource accessed by the entity over the predetermined period of time;
calculating a score of the current set of permissions;
determining which of the determined permutations of the groups of permissions have scores that are below the score of the current set of permissions; and
outputting information pertaining to the determined permutations that have scores that are below the score of the current set of permissions.

15. The method of claim 14, further comprising:
mapping the current set of permissions to low level permissions; and
assigning the score of the current set of permissions as a score of the low level permissions.

16. The method of claim 14, wherein each permission of the current set of permissions is assigned one of a plurality of values that correspond to respective attack surfaces of the permission, and wherein the method further comprises:
multiplying the values assigned to the permissions in the current set to calculate the score of the current set of permissions.

17. A non-transitory computer-readable medium on which is stored computer-readable instructions that when executed by a processor, cause the processor to:
identify activities performed by an entity on a resource over a predetermined period of time, wherein the entity is to use a permission assigned to the entity over the resource to perform the identified activities;
identify groups of permissions that include the permission the entity used to perform the identified activities, wherein each of the groups of permissions is assigned a value based on a count of attack surfaces of the permissions in the group;
determine permutations of the groups of permissions, wherein the permutations are various combinations of the groups of permissions that include the permission that the entity used to perform the identified activities;
calculate respective scores for each of the determined permutations of the groups of permissions based on the values assigned to the groups of permissions;
arrange the determined permutations according to the calculated scores to identify permutations of the groups of permissions having lowest scores; and
output information pertaining to the permutations having the lowest scores.

18. The non-transitory computer-readable medium of claim 17, wherein to calculate the respective scores for the determined permutations of the groups of permissions, the instructions further cause the processor to:
for each determined permutation, multiply the values assigned to the groups of permissions in the determined permutation to calculate the score for the determined permutation.

19. The non-transitory computer-readable medium of claim 17, wherein the instructions further cause the processor to:
identify a current set of permissions assigned to the entity over a plurality of resources including the resource accessed by the entity over the predetermined period of time;
calculate a score of the current set of permissions;
determine which of the determined permutations of the groups of permissions have scores that are below the score of the current set of permissions; and
output information pertaining to the determined permutations that have scores that are below the score of the current set of permissions.

20. The non-transitory computer-readable medium of claim 17, wherein the instructions further cause the processor to:
identify a permutation of the groups of permissions having a lowest score; and
assign a permission in the identified permutation having the lowest score to the entity over the resource.

* * * * *